Patented Oct. 28, 1952

2,615,862

UNITED STATES PATENT OFFICE 2,615,862

PROCESS FOR REACTING AZELAIC DIHYDRAZIDE WITH OXALIC ACID

Samuel B. McFarlane, Jr., and Alfred L. Miller, Summit, N. J., assignors to Celanese Corporation of America, a corporation of Delaware No Drawing. Application April 9, 1949, Serial No. 86,602

2 Claims. (Cl. 260—78)

This invention relates to the production of novel polymeric compounds and relates more particularly to an improved process for the production of novel polymeric compounds having filament-forming properties.

An object of this invention is the provision of an improved process for the production of polymeric compounds.

Another object of this invention is the production of novel thermoplastic filament-forming polymers suitable for use in the production of films, foils, filaments, fibers and like products.

A further object of this invention is the production of filament-forming polymeric materials of a high degree of stability and free of cyclic groups in the polymeric chain.

Other objects of this invention will appear from the following detailed description.

We have found that valuable thermoplastic nitrogen-containing polymers may be obtained by reacting an aliphatic, alicyclic, aromatic or aralkyl dicarboxylic acid, or their corresponding dicarboxylic acid esters, acid chlorides or anhydrides which yield dicarboxylic acids on hydrolysis, with an aliphatic, alicyclic or aromatic dihydrazide in a neutral or inert organic solvent at polymerization temperatures. As examples of neutral or inert organic solvents which may be employed in effecting said polymerization reaction, there may be mentioned nitrobenzene, xylenols such as 1,2,4-xylenol or 1,3,5-xylenol, cresols such as meta-cresol, dichlorobenzenes such as ortho and para-dichlorobenzene or nitroalkanes such as, for example, 2-nitropropane. Optimum results are achieved employing a polymerization reaction temperature of 170 to 190° C., particularly when nitrobenzene is employed as the solvent, and continuing the reaction for from about 1 to 6 hours, after which period a polymer exhibiting excellent fiber and filament-forming properties is obtained. These polymers are true polyhydrazides containing little or no cyclic groups. The aliphatic dicarboxylic acid, or the corresponding anhydride, acid chloride or diester are preferably reacted with the aliphatic dihydrazide in equimolecular ratio to obtain polymers of very high molecular weights. An excess of either the dicarboxylic acid or the dihydrazide may be employed, and in an amount up to about 5% by weight, in order to avoid any viscosity changes when the polymers are subjected to high temperatures, as in melt spinning.

The dihydrazides and dicarboxylic acids or derivatives thereof yielding a dicarboxylic acid on hydrolysis which we employ, in accordance with our novel process, may contain either a straight hydrocarbon chain between the carboxy or hydrazine groups, i. e. an alkylene group, or the intermediate hydrocarbon chain may be of a branched chain structure in which the hydrogen atoms in one or more of the methylene groups are substituted by an alkyl group. These compounds should, of course, be free of reactive groups other than the carboxyl groups or derivatives thereof, and of reactive groups other than the hydrazide groups which may interfere with the reaction. Furthermore, we may also employ N-alkyl-substituted dihydrazides. Suitable dihydrazides which we may employ in our novel process are, for example, aliphatic dihydrazides such as oxalic dihydrazide, malonic dihydrazide, succinic dihydrazide, glutaric dihydrazide, adipic dihydrazide, pimelic dihydrazide, suberic dihydrazide, azelaic dihydrazide, α-methyl adipic dihydrazide, β-methyl adipic dihydrazide, α,β-dimethyl adipic dihydrazide, β,β-dimethyl adipic dihydrazide, and N,N'-dimethyl adipic dihydrazide, alicyclic dihydrazides such as cyclohexane dicarboxylic acid dihydrazide, cyclohexane diacetic acid dihydrazide or cyclohexene dicarboxylic acid dihydrazide, and aromatic dihydrazides such as terephthalic acid dihydrazide, isophthalic acid dihydrazide and phthalic acid dihydrazide or an aralkyl dihydrazide such as phenylene diacetic acid dihydrazide.

Various aliphatic, alicyclic or aromatic dicarboxylic acids and their derivatives, as mentioned above, which yield said acids on hydrolysis are suitable for use in the preparation of said filament-forming polymeric compounds in accordance with our invention. As examples of said compounds, there may be mentioned oxalic acid, dimethyl oxalate, diethyl oxalate and other alkyl esters of oxalic acid, malonic acid, malonic acid anhydride, diethyl malonate, dipropyl malonate, dibutyl malonate, as well as other alkyl esters, succinic acid, succinic acid anhydride, dimethyl succinate, diethyl succinate, dipropyl succinate, dibutyl succinate and other succinic acid esters, glutaric acid, glutaric acid anhydride, dipropyl glutarate, dimethyl glutarate, diethyl glutarate, dibutyl glutarate, etc., adipic acid, adipic anhydride, diethyl adipate, dimethyl adipate, dipropyl adipate, dibutyl adipate, pimelic acid, isopimelic acid, diethyl pimelate and other alkyl esters of both pimelic acid and isopimelic acid, suberic acid, diethyl suberate, dimethyl suberate, dipropyl suberate, dibutyl suberate, or other alkyl esters of suberic acid, as well as azelaic acid, diethyl azelate, dimethyl azelate, dipropyl azelate and dibutyl azelate or other alkyl esters of azelaic acid. Alicyclic dicarboxylic acids such as cyclohexane dicarboxylic acid or cyclohexane diacetic acid, and aromatic dicarboxylic acids such as terephthalic acid, isophthalic acid, phthalic acid or phenylene diacetic acid are also suitable.

Our novel process enables polyhydrazides of a heterogeneous structure to be readily obtained. Thus, the polyhydrazide polymers may have the formula

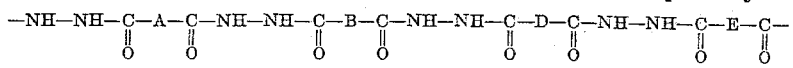

wherein each of A, B, D and E may be the same or a different divalent alkylene, alicyclic, aromatic or aralkyl residue, or any combination thereof, depending upon the particular dihydrazide and dicarboxylic acid or dicarboxylic acid derivative, or mixture of dihydrazides and dicarboxylic acids or derivatives thereof, subjected to the polymerization reaction.

In order further to illustrate our invention, but without being limited thereto, the following examples are given:

*Example I*

5.40 parts by weight (0.025 mols) of azelaic dihydrazide and 3.654 parts by weight of ethyl oxalate (0.025 mols) are dissolved in 30 parts by weight of nitrobenzene and the reaction mixture obtained heated at 180° C. for three hours. A polymerization reaction takes place with the formation of a polymer having a melting point of 260° C. The polymer is quite stable toward the action of heat and may be melt-spun into filaments which exhibit a draw of 100 to 400% at 50° C.

*Example II*

3.68 parts by weight (0.025 mols) of succinic dihydrazide and 5.05 parts by weight of sebacic acid (0.025 mols) are dissolved in 30 parts by weight of nitrobenzene and the reaction mixture heated at 175° C. for two and three-quarter hours. Polymerization takes place with the formation of a polymer melting at 300° C. The polymer may be melt-spun and yields excellent fibers which have a draw of 100 to 400% at 50° C.

*Example III*

A mixture of 4.355 parts by weight (0.025 mols) of adipic dihydrazide and 2.952 parts by weight (0.025 mols) of succinic acid in 30 parts by weight of nitrobenzene is heated to 180° C. for 3 hours. A polymer melting at 285° C. and which may be melt-spun into excellent fibers is obtained.

*Example IV*

A mixture of 5.407 parts by weight of azelaic dihydrazide (0.025 mols) and 3.152 parts by weight of oxalic acid (0.025 mols) in 30 parts by weight of nitrobenzene is heated at 180° C. for 2½ hours. A polymer melting at 265° C. and which may be readily melt-spun into excellent fibers is obtained.

*Example V*

540 parts by weight (2.5 mols) of azelaic dihydrazide and 470 parts by weight (2.5 mols) of azelaic acid are dissolved in 3000 parts by weight of mixed xylenols and the mixture heated to 200° C. for six hours. A polymer is obtained melting at 215° C. which yields good fibers on melt spinning.

*Example VI*

A mixture of 3.654 parts by weight (0.025 mols) of ethyl oxalate and 4.355 parts by weight (0.025 mols) of adipic dihydrazide in 30 parts by weight of nitrobenzene is heated to 170° C. for 3 hours. A polymer melting at 285–290° C. and which may be melt-spun into excellent fibers is obtained.

*Example VII*

A mixture of 4.355 parts by weight (0.025 mols) of adipic dihydrazide and 4.706 parts by weight (0.025 mols) of azelaic acid in 30 parts by weight of nitrobenzene is heated at 170° C. for 3 hours. A polymer melting at 390° C. and which may be melt-spun into excellent fibers is obtained.

*Example VIII*

A mixture of 4.355 parts by weight (0.025 mols) of adipic dihydrazide and 5.056 parts by weight (0.025 mols) of sebacic acid in 30 parts by weight of nitrobenzene is heated to 180° C. for 3 hours. A polymer melting at 295° C. and which may be melt-spun into excellent fibers is obtained.

*Example IX*

A mixture of 3.550 parts by weight (0.025 mols) of terephthalic acid and 4.355 parts by weight (0.025 mols) of adipic dihydrazide in 30 parts by weight of nitrobenzene is heated to 170° C. for 3 hours. A polymer melting at more than 300° C. and which may be melt-spun into excellent fibers is obtained.

*Example X*

A mixture of 3.700 parts by weight (0.025 mols) of 1,4-cyclohexanedicarboxylic acid and 4.355 parts by weight (0.025 mols) of adipic dihydrazide in 30 parts by weight of nitrobenzene is heated to 170° C. for 3 hours. A polymer melting at more than 300° C. which may be melt-spun into excellent fibers is obtained.

Our novel process wherein a dihydrazide is reacted with a dicarboxylic acid enables the reaction to be effected with an excellent degree of control so that cyclization is substantially or even entirely avoided and true polyhydrazides are formed.

It is to be understood that the foregoing detailed description is given merely by way of illustration and that many variations may be made therein without departing from the spirit of our invention.

Having described our invention, what we desire to secure by Letters Patent is:

1. Process for the production of a polymer, which comprises reacting at a temperature of 170 to 190° C. azelaic dihydrazide with an equimolecular quantity of oxalic acid in a reaction medium consisting of nitrobenzene.

2. Process for the production of a polymer, which comprises reacting azelaic dihydrazide with an equimolecular quantity of oxalic acid at a temperature of about 180° C. in a reaction medium consisting of nitrobenzene.

SAMUEL B. McFARLANE, Jr.
        ALFRED L. MILLER.

REFERENCES CITED

The following references are of record in the file of this patent:

UNITED STATES PATENTS

| Number | Name | Date |
|---|---|---|
| 2,349,979 | Moldenhauer et al. | May 30, 1944 |
| 2,395,642 | Prichard | Feb. 26, 1946 |

FOREIGN PATENTS

| Number | Country | Date |
|---|---|---|
| 870,259 | France | Dec. 5, 1941 |
| 884,794 | France | Aug. 26, 1943 |